(12) United States Patent
Wiegelmann et al.

(10) Patent No.: US 9,586,553 B2
(45) Date of Patent: Mar. 7, 2017

(54) VEHICLE SEAT WITH SIDE AIRBAG AND SIDE BOLSTER ADJUSTMENT

(71) Applicant: GM GLOBAL TECHNOLOGY OPERATIONS LLC, Detroit, MI (US)

(72) Inventors: Joerg Wiegelmann, Bodenheim (DE); Günter Fleckenstein, Kleinkahl (DE); Juergen Nilius, Ginsheim-Gustavsburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/949,970

(22) Filed: Nov. 24, 2015

(65) Prior Publication Data

US 2016/0152203 A1   Jun. 2, 2016

(30) Foreign Application Priority Data

Nov. 27, 2014   (DE) .................. 10 2014 017 605

(51) Int. Cl.
| | |
|---|---|
| *B60R 21/207* | (2006.01) |
| *B60N 2/58* | (2006.01) |
| *B60N 2/44* | (2006.01) |
| *B60R 21/215* | (2011.01) |

(52) U.S. Cl.
CPC .......... *B60R 21/207* (2013.01); *B60N 2/4492* (2015.04); *B60N 2/58* (2013.01); *B60N 2/5858* (2013.01); *B60R 21/215* (2013.01); *B60N 2002/5808* (2013.01); *B60R 2021/21531* (2013.01)

(58) Field of Classification Search
CPC ............... B60R 21/207; B60R 21/215; B60R 2021/21531; B60N 2/4492; B60N 2/58; B60N 2/5858; B60N 2002/5808
See application file for complete search history.

(56) References Cited

U.S. PATENT DOCUMENTS

| | | | | |
|---|---|---|---|---|
| 6,045,151 | A * | 4/2000 | Wu .................... | B60R 21/207 280/728.3 |
| 7,441,797 | B2 * | 10/2008 | Tracht ................ | B60R 21/207 280/730.2 |
| 2008/0136237 | A1 * | 6/2008 | Kayumi .............. | B60N 2/4492 297/284.9 |

(Continued)

FOREIGN PATENT DOCUMENTS

| | | |
|---|---|---|
| DE | 10019493 A1 | 10/2001 |
| DE | 10238909 C1 | 10/2003 |

(Continued)

OTHER PUBLICATIONS

German Patent Office, German Search Report for German Application No. 102014017605.3, dated Sep. 1, 2015.

*Primary Examiner* — Darlene P Condra
(74) *Attorney, Agent, or Firm* — Lorenz & Kopf LLP

(57) ABSTRACT

A vehicle seat is provided that has two side bolsters and a central seat part arranged between the latter. Further provided are adjusting devices for adjusting the side bolsters on the sides facing the central seat part. A side airbag is integrated into one side bolster of the side bolsters, on its side facing away from the central seat part. A non-elastic seat cover is provided for this side bolster. The seat cover has an airbag seam. The seat cover is elastically attached in the area of an end facing away from the side airbag.

14 Claims, 5 Drawing Sheets

(56) References Cited

U.S. PATENT DOCUMENTS

| | | |
|---|---|---|
| 2010/0295282 A1 | 11/2010 | Kim et al. |
| 2012/0043791 A1 | 2/2012 | Kojima |
| 2013/0169010 A1 | 7/2013 | Sugiyama et al. |
| 2014/0001799 A1* | 1/2014 | Kalisz ............... B60R 21/207 297/216.1 |
| 2014/0077480 A1* | 3/2014 | Festag ............... B60R 21/207 280/728.3 |
| 2016/0009209 A1* | 1/2016 | Cao ................... B60N 2/4802 297/354.12 |

FOREIGN PATENT DOCUMENTS

| | | |
|---|---|---|
| DE | 10340508 A1 | 3/2005 |
| DE | 102008053080 A1 | 4/2010 |
| DE | 102010021067 A1 | 11/2011 |
| DE | 102011116634 A1 | 4/2013 |
| EP | 0827880 A2 | 3/1998 |
| JP | 2002154361 A | 5/2002 |
| JP | 2010142275 A | 7/2010 |
| JP | 2010279488 A | 12/2010 |

\* cited by examiner

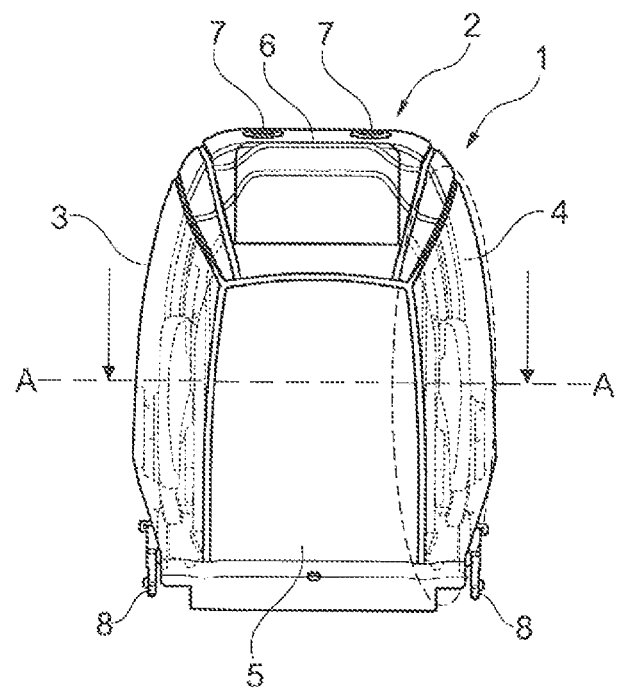
Fig. 1
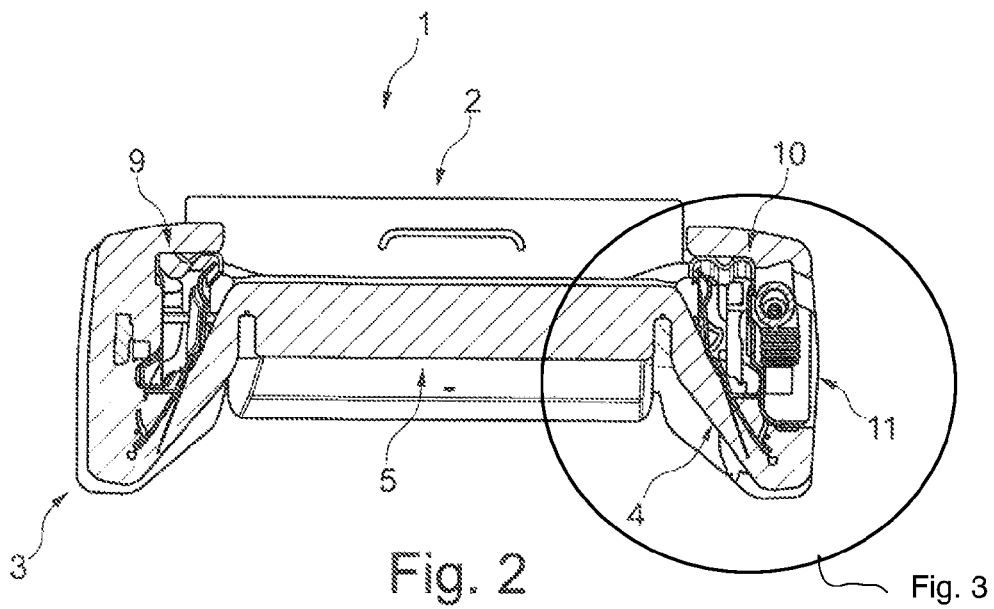
Fig. 2
Fig. 3

VEHICLE SEAT WITH SIDE AIRBAG AND SIDE BOLSTER ADJUSTMENT

CROSS-REFERENCE TO RELATED APPLICATION

This application claims priority to German Patent Application No. 102014017605.3, filed Nov. 27, 2014, which is incorporated herein by reference in its entirety.

TECHNICAL FIELD

The present disclosure pertains to a vehicle seat with adjustable side bolsters, wherein a side airbag is integrated into one of the side bolsters.

BACKGROUND

Vehicle seats that have adjustable side bolsters and include a side airbag in the area of a side bolster, specifically of a side bolster allocated to an exterior side of the motor vehicle, are known from practice. A central part is arranged between the two side bolsters. By adjusting the side bolsters, the latter can be optimally adapted to the body shape of the individual using the vehicle seat. The side airbag integrated into the side bolster protects the individual if the vehicle is involved in a side collision.

It is further known to manufacture vehicle seats with an elastic and/or non-elastic seat cover. A non-elastic seat cover is used in particular in those areas of the vehicle seat where no change in shape of the vehicle seat takes place. Elastic seat covers are provided for vehicle seats in locations where a deformation of the vehicle seat is desired, in particular in areas where the contour of the vehicle seat can be adjusted.

DE 103 40 508 A1 describes a vehicle seat which integrates a side airbag. A seat cover made out an elastic fabric is here used. A plastic strip with a predetermined breaking point is provided at an outlet position of the side airbag. The plastic strip is anchored on a seat cushion, which breaks open when the side airbag deploys.

SUMMARY

In accordance with various embodiments of the invention herein disclosed, a vehicle seat is provided with an adjustable side bolster and a side airbag allocated thereto it such a way as to prevent a deformation of the side bolster caused by a tensioning of the seat cover when adjusting the side bolster.

A vehicle seat according to herein described embodiments of the invention includes two side bolsters and a central seat part arranged between the latter, along with adjusting devices for adjusting the side bolsters on the sides facing the central seat part, as well as a side airbag integrated into one of the side bolsters on its side facing away from the central seat part. Such a vehicle seat further has a non-elastic seat cover for this side bolster, i.e., the side bolster having the side airbag. The seat cover has an airbag seam, and the seat cover is elastically attached in the area of an end facing away from the side airbag.

As a consequence, vehicle seats according to the herein described embodiments of the invention fulfills two opposite functions. Bolster adjustment requires an elastic seat cover, while the airbag function requires a reliable opening by the airbag seam, and hence a non-elastic seat cover. Both functions—bolster adjustment and integrated side airbag—vary in terms of the load they place on the seat cover. For this reason, as herein described in connection with embodiments of the invention, the seat cover is elastically attached in the area of the end facing away from the side airbag. Therefore, the seat cover can act elastically in the bolster adjustment direction in terms of extending the bolster, and act non-elastically in the side airbag direction. In the area of the end facing the side airbag, the seat cover is thus fixed in place, and cannot give, while the seat cover in the area of the other end is flexibly mounted. It is viewed as particularly advantageous for the seat cover to be elastically attached in the area of the central seat part and the side bolster that exhibits the side airbag. This makes it especially easy to attach the seat cover, in particular to mount it in a seat structure of the vehicle seat. Preferably formed between the central seat part and this side bolster is a gap, in the area of which the seat cover can uncomplicatedly be elastically attached.

The elastic attachment can be realized in a particularly easy manner using an elastic fabric, which is joined with the non-elastic seat cover on the one hand, and mounted in the seat structure on the other. This mounting can here definitely take place indirectly in the seat structure. For example, it is provided in particular that the seat structure be joined with a holder or hook ring, to which the elastic fabric is attached.

In a special configuration of the non-elastic seat cover, it is provided that the latter have a first cover part and a second cover part. In particular, the first cover part is advantageously arranged on the exterior side of the side bolster having the side airbag that faces the side airbag, and the second cover part is arranged on the interior side facing the central seat part and on a front side between the interior side and exterior side. As a consequence, the first cover part is arranged in the area of this side bolster, which undergoes no deformation and has the side airbag positioned in its area. By contrast, the other cover part is positioned in the area of this side bolster, which is adjustable, so that importance in this area of the side bolster is placed on the non-elastic seat cover being able to follow the deformation of the side bolster due to its elastic attachment.

An exemplary embodiment provides that the two cover parts be joined together. In particular, the two cover parts are sewn together. In this configuration, the non-elastic seat cover is elastically coupled exclusively in the area of the end of the seat cover facing away from the side airbag. It is here regarded as especially advantageous for the first cover part to exhibit the airbag seam, or for the airbag seam to be formed by joining together the two cover parts.

Another exemplary embodiment provides that the facing area of the two cover parts not be joined together, wherein the first cover part is non-elastically attached and the second cover part is elastically attached in this facing area. This connection of the second cover part allows the second cover part to flexibly yield in both the area where the two cover parts are adjacent when changing the contour of the side bolster exhibiting the side airbag, as well as to yield in the area of the end facing away from the side airbag, as in the first embodiment. In this configuration, the second cover part of the non-elastic seat cover is hence mounted so as to exert an elastic effect on two sides.

The second cover part flexibly mounted on two sides provides in particular that a gap into which the ends of the two cover parts are introduced be formed in the side bolster exhibiting the side airbag in the area of its front side. As a consequence, the two cover parts are attached in the area of this gap, thereby yielding a smooth surface contour of the side bolster in the transitional area of the two cover parts. In particular, the second cover part is elastically attached in the area of the gap. It is also regarded as especially advantageous with respect to this attachment that this take place by elastic fabric. The latter is in particular joined with the non-elastic second cover part on the one hand, and mounted in the seat structure on the other. Preferably connected with the seat structure is a holder or hook ring, to which the elastic fabric is attached.

The central seat part and two side bolsters can also involve different areas of the vehicle seat. In particular, it is provided that the central seat part and two side bolsters comprise part of a backrest of the vehicle seat. However, they can definitely also comprise part of a seat cushion of the vehicle seat.

BRIEF DESCRIPTION OF THE DRAWINGS

The present invention will hereinafter be described in conjunction with the following drawing figures, wherein like numerals denote like elements.

FIG. 1 is the backrest of the vehicle seat according to herein described embodiments of the invention, viewed opposite the forward traveling direction;

FIG. 2 is a section through the backrest according to line A-A on FIG. 1 for an exemplary embodiment;

DETAILED DESCRIPTION

Figure 3:
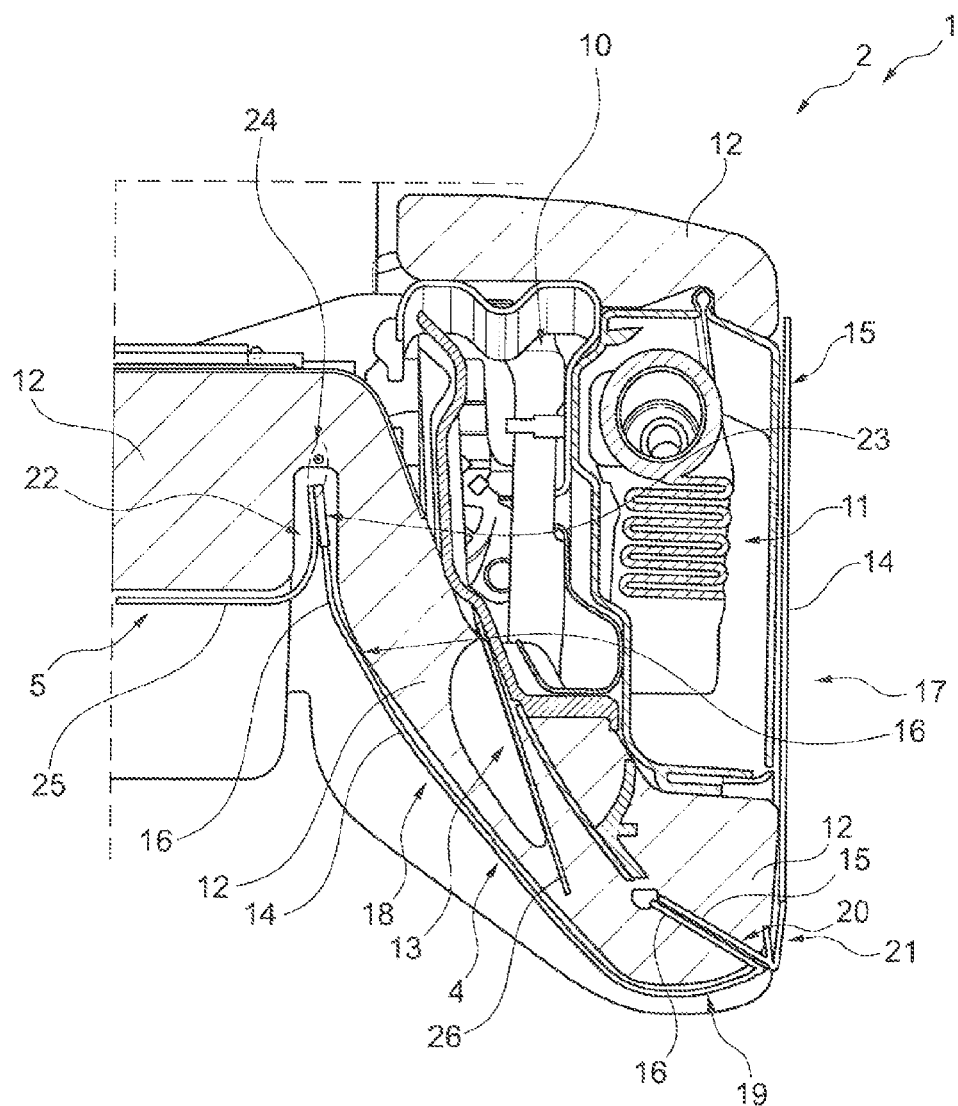
FIG. 3 is a section through the partial area of the backrest illustrated by a circle on FIG. 2 according to line A-A on FIG. 1, with focus on a side bolster exhibiting a side airbag and a central seat part arranged adjacent to the side bolster, illustrated for the side bolster in the retracted state.

The following detailed description is merely exemplary in nature and is not intended to limit the invention or the application and uses of the invention. Furthermore, there is no intention to be bound by any theory presented in the preceding background of the invention or the following detailed description.

FIG. 1 shows the backrest 2 of a vehicle seat 1 as viewed opposite the forward traveling direction. FIG. 2 shows this backrest 2 in a horizontal section according to line A-A on FIG. 1. As evident from the figures, the backrest has two side bolsters 3, 4 and a central seat part 5 or backrest part arranged between the latter. A shoulder part 6 between the two side bolsters 3, 4 adjoins the central seat part 5 at the top. In the area of the upper end, the shoulder part 6 is provided with two receptacles 7 for inserting a headrest. In the lower end, the backrest 2 has pivoting hinges 8 for swivelably accommodating the backrest 2 in a seat cushion of the vehicle seat 1.

As evident from the sectional view according to FIG. 2, an adjusting device 9 for adjusting the side bolster 3 is integrated into the side bolster 3, and an adjusting device 9 for adjusting the side bolster 4 is integrated into the side bolster 4. The side bolster 4 directed toward the door side of the motor vehicle, in particular of the passenger car, is additionally provided on the side facing away from the central seat part 5 with a side airbag 11, which is integrated into the side bolster 4.

Figure 4:
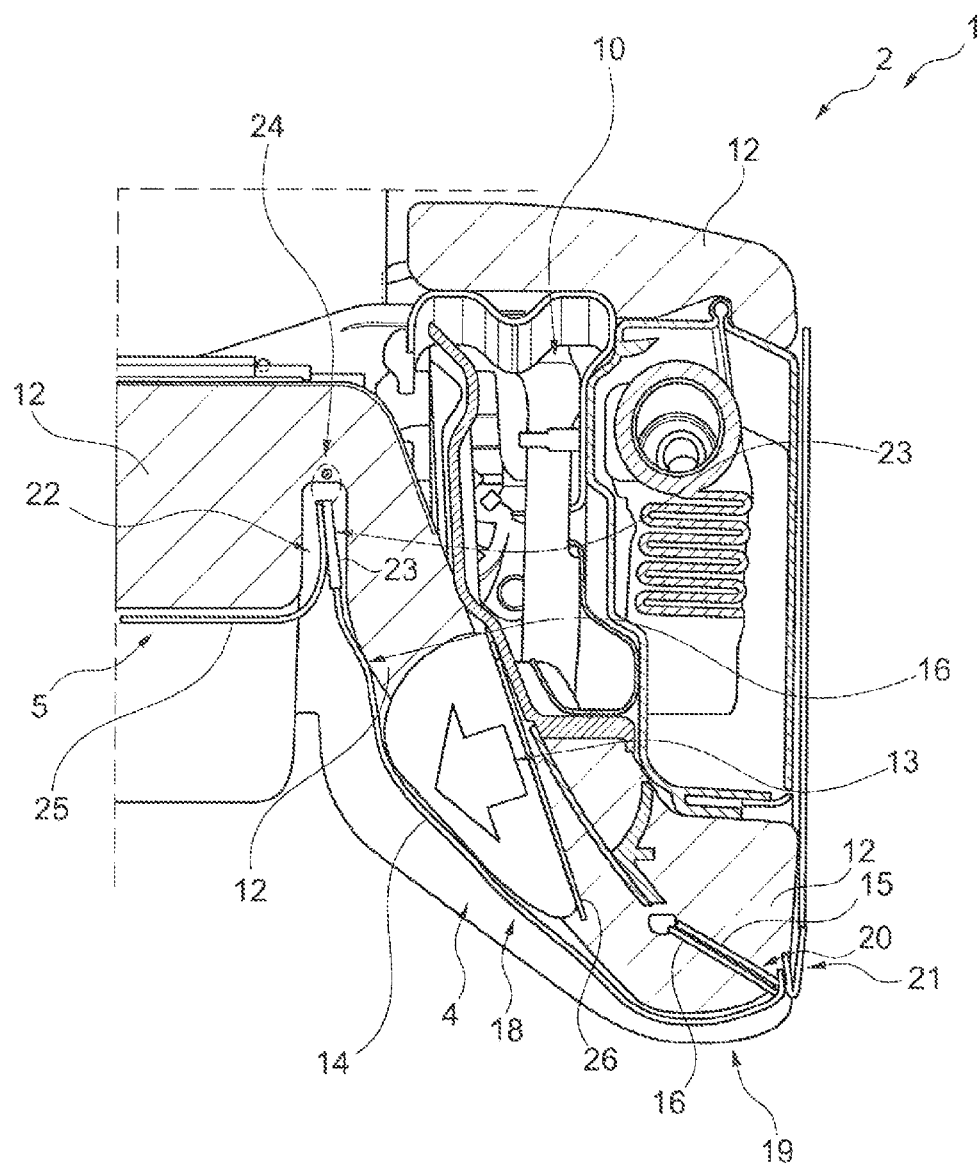
FIG. 4 is the arrangement according to FIG. 3, illustrated for the side bolster in the extended state.
Figure 5:
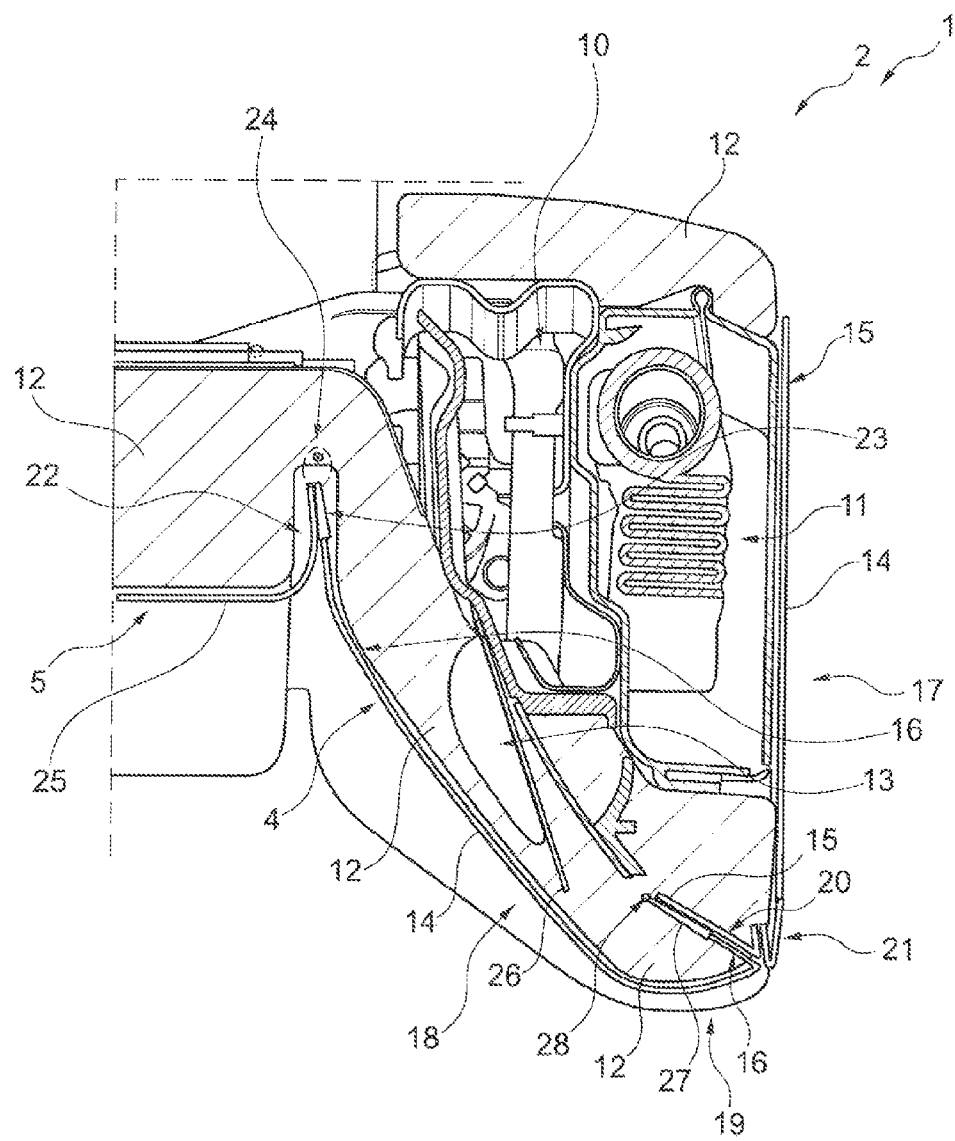
FIG. 5 is a section according to FIG. 3 through the illustrated partial area of the backrest for another exemplary embodiment, with focus on a side bolster having a side airbag and a central seat part arranged adjacent to the side bolster, illustrated for the side bolster in the retracted state.
Figure 6:
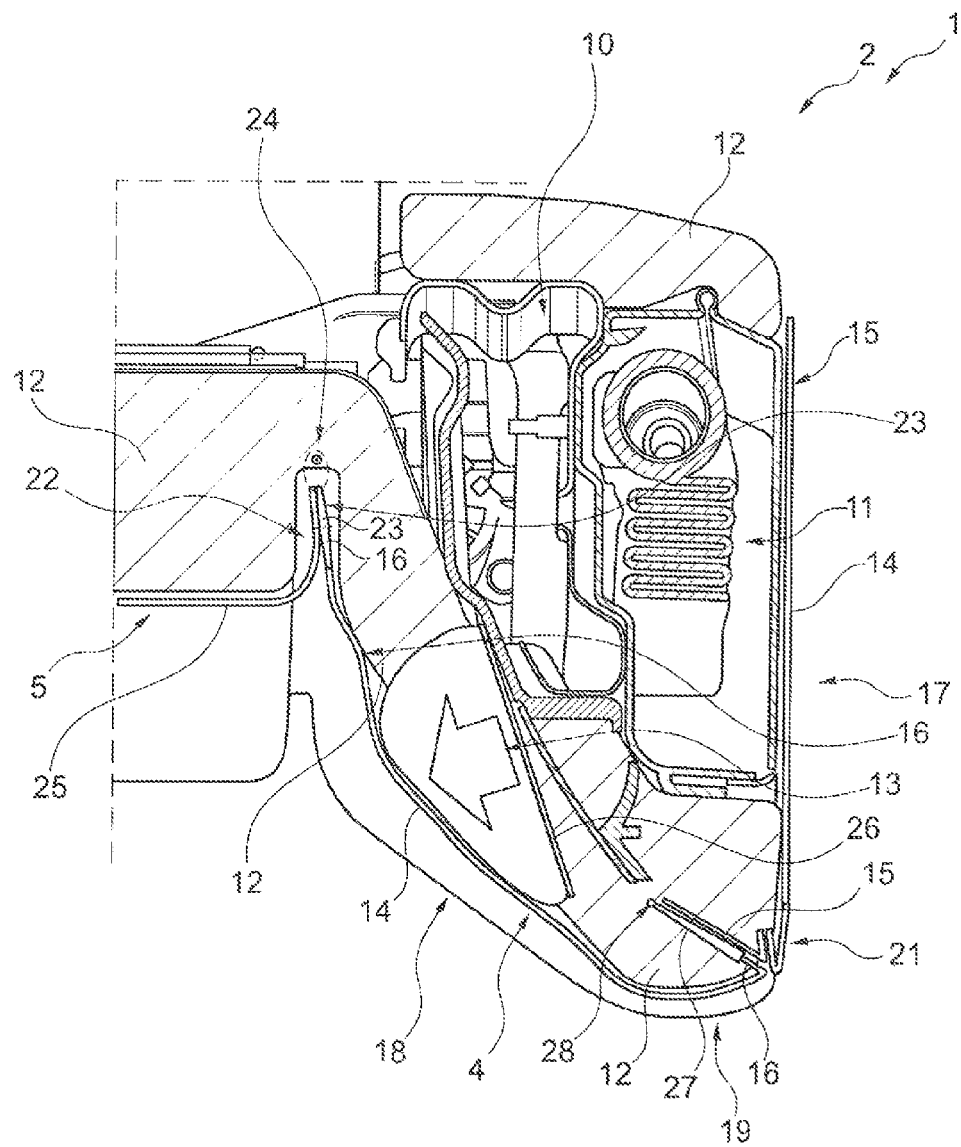
FIG. 6 is the arrangement according to FIG. 5, illustrated for the side bolster in the extended state.

FIGS. 3 to 6 illustrate the area of the side bolster 4 marked with the circle on FIG. 2 for two different exemplary embodiments, specifically with the side bolster 4 not in the extended position (FIGS. 3 and 5), and with the side bolster 4 in the extended position (FIGS. 4 and 6).

A first exempla embodiment according to FIGS. 3 and 4 will be explained in more detail below:

A seat structure 12 integrates the side bolster 4 and central seat part 5 (along with the side bolster 3 not illustrated on these figures). A bladder 13 allocated to the side bolster 4 is mounted in the seat structure 12. The adjusting device 10 can be used to inflate the latter from the large empty position, and hence unloaded position according to FIG. 3, to the filled position, and hence loaded position according to FIG. 4, and then return it from the latter to the empty position again according to FIG. 3. In this way, the side bolster 4 can be extended from the configuration of the side bolster 4 according to FIG. 3 into the position of the side bolster 4 according to FIG. 4. Because the side bolster 4 (and thus the side bolster 3 as well) can be adjusted, a seat cover would have to be elastic in this area. However, this would run counter to the requirement placed on the seat cover in the area of the side airbag 11. In order to ensure that the airbag seam is reliably undone, a non-elastic seat cover is required there.

In this aspect, the exemplary embodiment is provided with a non-elastic seat cover 14, in particular a seat cover 14 made out of leather. This seat cover 14 has a first cover part 15 and a second cover part 16. The first cover part 15 is situated on the exterior side 17 of the side bolster 4 facing the side airbag 11, and the second cover part 16 is situated on the interior side 18 of this side bolster 4 facing the central seat part 5 and a front side 19 of this side bolster 4 between the interior side 18 and exterior side 17. The side bolster 4 is provided with a gap 20 at the transition from the exterior side 17 to the front side 19. The two cover parts 15 and 16 are sewn together, and arranged in the double-walled sewing area inside of the gap 20. The first cover part 15 is provided with an airbag seam 21 adjacent to the gap 20.

A gap 22 is also provided between the side bolster 4 and central seat part 5. The end of the second cover part 16 facing the central seat part 5 is there joined with an elastic fabric 23, specifically an elastic fabric tape, and the end of this elastic fabric 23 facing away from the first cover part 15 is joined with the seat structure 12 by way of a hook ring 24. Another cover part 25 made out of leather, and hence non-elastic material, covers the central seat part 5, and is likewise inserted into the gap 22 and there held non-elastically in the hook ring 24.

In the area of its side facing away from the second cover part 16, the bladder 13 is supported on a support plate 26 allocated to the seat structure 12.

The side bolster 4 is not expanded with the bladder 13 not loaded, as illustrated on FIG. 3. The elastic fabric 23 is here hardly tensioned, so that the second cover part 16 is largely introduced into the gap 22.

If this bladder 13 is loaded, and hence inflated, it presses the second cover part 16 outward, as illustrated for the end state according to FIG. 4, so that an elevated tensile force is applied to the elastic fabric 23 via the second cover part 16, and this elastic fabric 23 expands. As a consequence, the non-elastic second cover part 16 can follow the variable contour of the side bolster 4, and the first cover part 15, which is also not elastic, otherwise remains unchanged in the area of the exterior side 17 of the side bolster 4.

The exemplary embodiment according to FIGS. 5 and 6 only differs from the one on FIGS. 3 and 4 in that the two facing ends of the cover parts 15 and 16 are not joined together, but rather mounted independently of each other in the seat structure 12. The first cover part 15 is mounted without any elastically acting intermediate part in the seat structure 12, while the second cover part 16 is mounted by way of an elastic fabric 27 in the seat structure 12. As a consequence, the second cover part 16 is elastically mounted at both ends, so that the elastic fabrics 23, 27 situated in the area of both ends of the second cover part 16 expand when the bladder 13 is inflated. The two cover parts 15 and 16 can be mounted in the gap 20 accordingly by means of a hook ring 28, which is connected with the seat structure 12, wherein the hook ring 28 serves to directly accommodate the first cover part 15 in the area of the gap 20 on the one hand, and further to accommodate the second cover part 16 via the elastic fabric 27 in the gap 20.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A vehicle seat with two side bolsters and a central seat part arranged between the side bolsters, adjusting devices for adjusting the side bolsters on sides of the side bolsters facing the central seat part, a side airbag, which is integrated into one of the side bolsters on a side of the side bolster facing away from the central seat part, and a non-elastic seat cover for this side bolster, wherein the seat cover has an airbag seam, and the seat cover is elastically attached in an area of an end of the seat cover facing away from the side airbag in an area of the central seat part, wherein the side bolster and the elastic attachment comprise an elastic fabric, which is joined with the non-elastic seat cover and is further joined to a seat structure of the vehicle seat.

2. The vehicle seat according to claim 1, wherein a gap is formed between the central seat part and the side bolster in which the side airbag is integrated, and the seat cover is elastically attached in the area of the gap.

3. The vehicle seat according to claim 1, wherein the elastic fabric joins with the non-elastic seat cover and is further mounted in the seat structure.

4. The vehicle seat according to claim 3, wherein the seat structure is joined with one of a holder and hook ring, to which the elastic fabric is attached.

5. The vehicle seat according to one of claim 1, wherein the non-elastic seat cover has a first cover part and second cover part.

6. The vehicle seat according to claim 5, wherein the first cover part is arranged on the exterior side of the side bolster facing the side airbag, and the second cover part is arranged on the side of the side bolster facing the central seat part and on a front side of the side bolster between the interior side and exterior side.

7. The vehicle seat according to claim 5, wherein the two cover parts are joined together.

8. The vehicle seat according to claim 7, wherein the first cover part has the airbag seam.

9. The vehicle seat according to claim 7, wherein the airbag seam is formed by joining together the two cover parts.

10. The vehicle seat according to claim 5, wherein facing areas of the two cover parts are not joined together, the first cover part being non-elastically attached to the seat structure and the second cover part being elastically attached to the seat structure in the facing area.

11. The vehicle seat according to claim 10, wherein a gap into which ends of the two cover parts are introduced is formed in the side bolster in the area of its front side.

12. The vehicle seat according to claim 11, the second cover part being elastically attached in the area of the gap.

13. The vehicle seat according to claim 12, wherein an elastic fabric joins with the non-elastic second cover part and is mounted in the seat structure.

14. The vehicle seat according to claim 1, wherein the central seat part and the two side bolsters comprise part of a backrest or a seat cushion of a vehicle seat.

* * * * *